(12) United States Patent
Condeelis

(10) Patent No.: US 6,902,215 B1
(45) Date of Patent: Jun. 7, 2005

(54) APPARATUS TO ATTACH A PROXIMITY SENSOR TO AN ENERGY ABSORBING VEHICLE BUMPER

(75) Inventor: Paul M. Condeelis, Marine City, MI (US)

(73) Assignee: Romeo-Rim, Inc., Romeo, MI (US)

( * ) Notice: Subject to any disclaimer, the term of this patent is extended or adjusted under 35 U.S.C. 154(b) by 0 days.

(21) Appl. No.: 10/794,813

(22) Filed: Mar. 8, 2004

(51) Int. Cl.[7] ............................................. B60R 19/02
(52) U.S. Cl. ...................................... 293/117; 293/102
(58) Field of Search ......................... 293/102, 117, 120, 293/121; 340/436

(56) References Cited

U.S. PATENT DOCUMENTS

| | | | | |
|---|---|---|---|---|
| 5,844,471 A | * | 12/1998 | Daniel .......................... | 340/436 |
| 5,951,194 A | * | 9/1999 | Faass et al. ................... | 403/256 |
| 6,039,367 A | * | 3/2000 | Muller et al. ................ | 293/117 |
| 6,318,774 B1 | * | 11/2001 | Karr et al. ................... | 293/117 |
| 6,340,187 B1 | * | 1/2002 | Villiere et al. ............... | 293/117 |
| 6,572,161 B2 | * | 6/2003 | Wild et al. ................... | 293/117 |
| 6,693,520 B2 | * | 2/2004 | Li ............................... | 340/436 |

* cited by examiner

*Primary Examiner*—Jason Morrow
(74) *Attorney, Agent, or Firm*—Renner, Kenner, Greive, Bobak, Taylor & Weber

(57) ABSTRACT

An energy absorbing bumper (14) includes an impact face (20) having a plurality of apertures (19) therein. Each aperture (19) receives a housing (10) which carries a proximity sensor (12). The housing (10) has channels (49) extending along an interior cylindrical surface (30) to properly align the proximity sensor (12) relative to the bumper face (20). The housing (10) also has a face surface (42) with a depression (64) to receive the proximity sensor (12) in a recessed manner. A frustoconical surface (32) of the housing (10) slides over the edges of the aperture (18) when the housing (10) is being inserted into the aperture (18) so that the edges of the aperture (18) snap fit into a groove (34) formed in the outer surface of the housing (10).

16 Claims, 4 Drawing Sheets

APPARATUS TO ATTACH A PROXIMITY SENSOR TO AN ENERGY ABSORBING VEHICLE BUMPER

TECHNICAL FIELD

The present invention relates to a device for attaching a proximity sensor to an energy absorbing vehicle bumper. More specifically, the present invention relates to proximity sensor housings provided to carry the proximity sensors. More particularly, the present invention relates to proximity sensor housings insuring the proper orientation of the proximity sensors relative to the energy absorbing vehicle bumper.

BACKGROUND ART

Various types of energy absorbing vehicle bumpers are known in the art. These energy absorbing vehicle bumpers absorb some of the energy of impact, and reduce the likelihood of significant damage to the vehicle. However, it is advantageous to avoid accidents causing such impacts. Various proximity sensors have been used to sense objects adjacent to vehicles. Such proximity sensors avoid accidents by alerting the driver of the vehicle to the presence of an object adjacent to the vehicle, and allowing the driver to stop or steer to avoid any impact. However, these proximity sensors can wear out due to extended use, and can break if bumped or otherwise contacted.

Therefore, there is a need for an energy absorbing vehicle bumper incorporating a device for attaching proximity sensors thereto. The device should insure proper orientation of the proximity sensor relative to the energy absorbing vehicle bumper. Furthermore, the device should easily engage, but simultaneously provide for secure attachment of the proximity sensor to the energy absorbing vehicle bumper. Moreover, the device should protect the proximity sensor from damage, but also allow for easy removal from the energy absorbing vehicle bumper if the proximity sensor is nevertheless damaged or otherwise in need of replacement.

DISCLOSURE OF THE INVENTION

It is thus an object of the present invention to provide an energy absorbing vehicle bumper incorporating a device for attaching proximity sensors thereto.

It is another object of the present invention to provide a bumper with a device, as above, which is in the form of the housing for a proximity sensor which insures proper orientation of the proximity sensor relative to the energy absorbing vehicle bumper.

It is yet another object of the present invention is to provide a bumper, as above, in which the housing for the proximity sensor provides for the secure attachment of the proximity sensor to the energy absorbing vehicle bumper.

It is yet another object of the present invention to provide a bumper, as above, in which the housing for the proximity sensor easily engages, and simultaneously provides secure attachment of the proximity sensor to the energy absorbing vehicle bumper.

It is still another object of the present invention to provide a bumper, as above, in which the housing for the proximity sensor protects the proximity sensor from damage, and also allows for easy removal from the energy absorbing vehicle bumper if the proximity sensor is nevertheless damaged.

These and other objects of the present invention, as well as the advantages thereof over existing prior art forms, which will become apparent for the description to follow, are accomplished by the improvements hereinafter described and claimed.

In general, an energy absorbing vehicle bumper made in accordance with the present invention includes an impact face having at least one aperture therein. A housing is positioned in the aperture and is adapted to receive a proximity sensor. The housing has an interior cylindrical surface with channels extending therealong to receive the proximity sensor. The housing also includes a frustoconical surface adapted to slide over the edges of the aperture. A groove is formed by opposed surfaces on the housing extending outwardly from an exterior cylindrical surface of the housing. The edge of the aperture is positioned in the groove.

In accordance with another aspect of the present invention, an energy absorbing bumper includes an impact face having at least one aperture therein. A housing is positioned in the aperture and has an interior surface adapted to receive a proximity sensor in proper alignment with the impact face. The housing has a face surface which is adapted to orient the proximity sensor relative to the housing.

In yet an additional aspect of the present invention, an energy absorbing bumper includes an impact face having at least one aperture therein. A housing is adapted to carry a proximity sensor and is received in the aperture. The housing has a face surface which includes a depression, with the proximity sensor being recessed within the depression when positioned in the housing.

A preferred exemplary energy absorbing vehicle bumper and housing according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
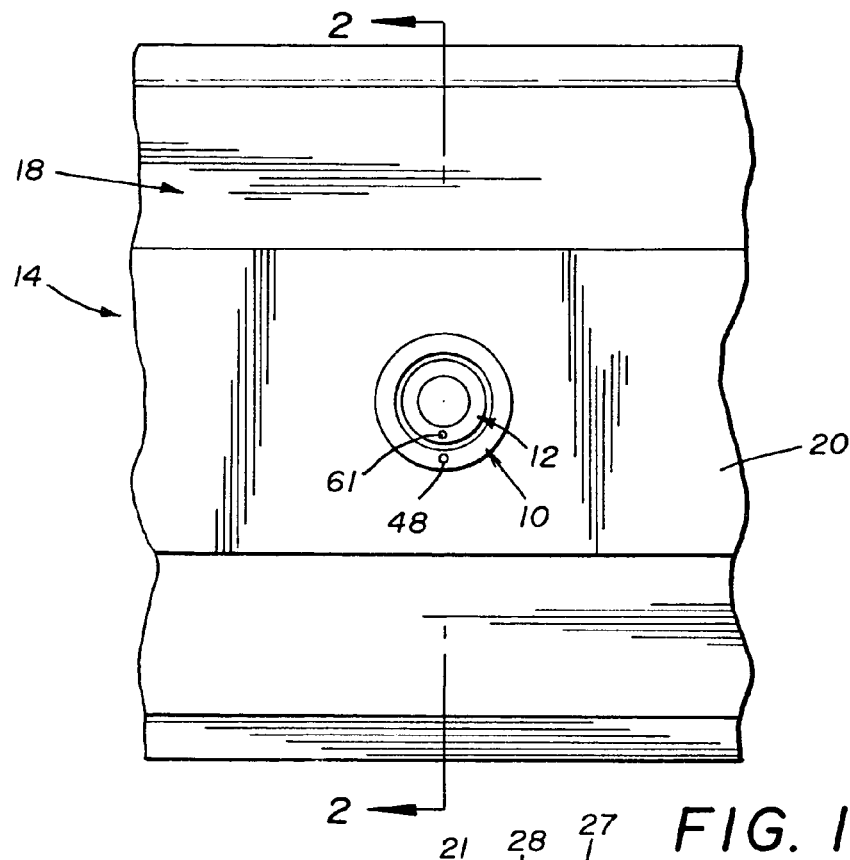
FIG. 1 is a fragmented elevational view of an assembly of a proximity sensor housing made in accordance with the present invention and a proximity sensor positioned in an energy absorbing vehicle bumper.

A housing made in accordance with the present invention is generally indicated by the numeral 10 and is configured to receive a conventional proximity sensor 12. Thereafter, housing 10 and proximity sensor 12 positioned therein are inserted into an energy absorbing vehicle bumper generally indicated by the numeral 14. Housing 10, as will be discussed hereinbelow, is configured to insure proper orientation of proximity sensor 12 relative to vehicle bumper 14.

Figure 2:
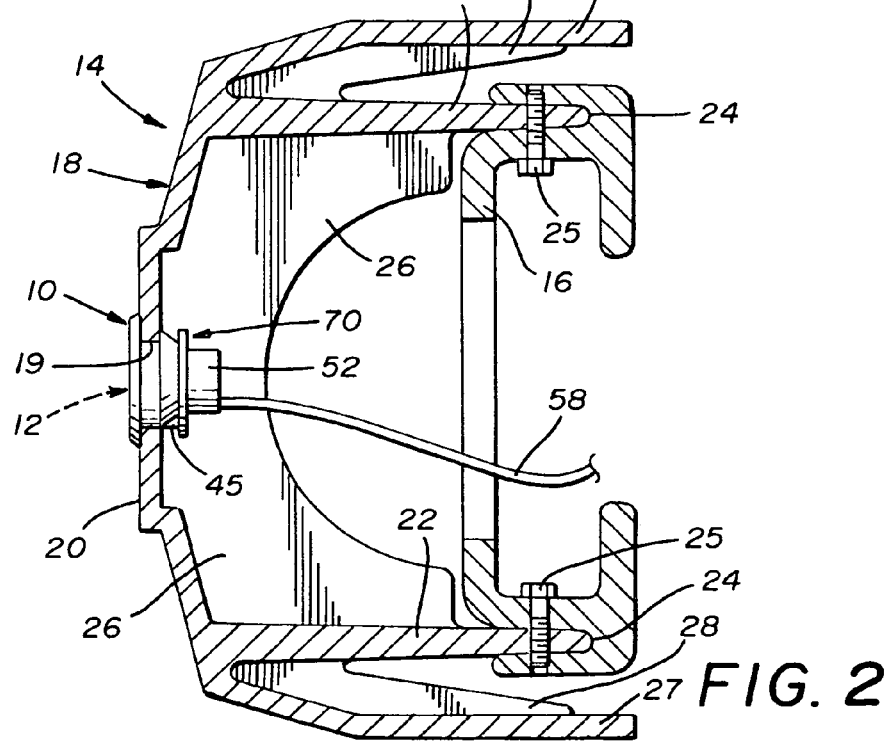
FIG. 2 is a sectional view taken substantially along line 2—2 of FIG. 1.
Figure 3:
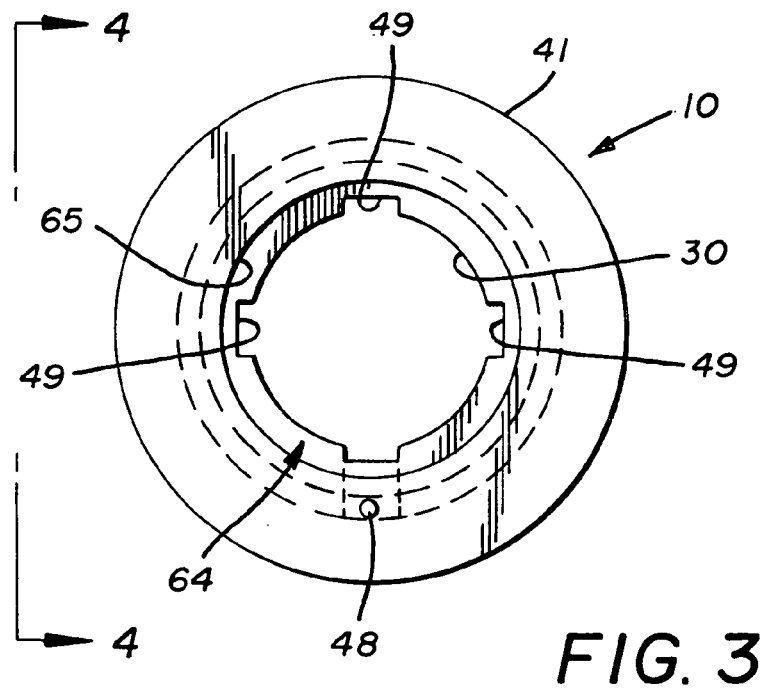
FIG. 3 is a front elevational view of a proximity sensor housing made in accordance with the present invention.

A plurality of housings 10 and proximity sensors 12 received therein can be spaced along vehicle bumper 14, one such assembly being shown in FIG. 1. As seen in FIG. 2, vehicle bumper 14 includes a metallic back plate 16 which can be mounted to the front or rear of a vehicle. Back plate 16 carries a bumper module, generally indicated by the numeral 18, which includes a front impact face 20 and upper and lower walls 21 and 22, respectively. Longitudinally spaced, substantially circular apertures 19 can be provided in front impact face 20, and a housing 10 with a proximity sensor 12 received therein can be inserted into these apertures 19.

To attach vehicle bumper 14 to back plate 16, the rear end of walls 21 and 22 are received in slots 24 of back plate 16 and attached thereto by bolts 25. A plurality of generally C-shaped vertical ribs 26 enhance the energy absorption of vehicle bumper 14, and are spaced longitudinally within module 18. Vertical ribs 26 extend rearwardly from impact face 20 and along upper and lower walls 21 and 22. Vehicle bumper 14 is also shown as having upper and lower wings 27 with reinforcing ribs 28 extending therefrom to upper and lower walls 21 and 22. These wings 27 are primarily for aesthetic purposes and generally play no role in the energy absorbing characteristics of the system.

As seen in FIGS. 3, and 5–7, housing 10 includes a generally cylindrical interior surface 30 adapted to receive proximity sensor 12. The exterior of housing 10 is adapted to be releasably secured in apertures 19. The exterior includes a frustoconical surface 32 which, as will hereinafter be described in more detail, serves as a "wedge," and allows housing 10 to be snap-fit into apertures 19.

The exterior of housing 10 also includes a first outer cylindrical surface 33 which spaces frustoconical surface 32 from a groove 34. Groove 34 is formed by a first opposed surface 37 and a second opposed surface 38 spaced by a second outer cylindrical surface 40. First opposed surface 37 and second opposed surface 38 extend radially outwardly from second outer cylindrical surface 40.

Ultimately, a housing 10 is inserted into one of the apertures 19 in vehicle bumper 14, and the edges of aperture 19 are effectively clamped between first opposed surface 37 and second opposed surface 38. Moreover, the second outer cylindrical surface 40 is sized to match the diameter of the aperture 19. When fitting housing 10 into the aperture 19, frustoconical surface 32 can slide over the edges of the aperture 19, even if the aperture 19 has a diameter smaller than first outer cylindrical surface 33. As such, frustoconical surface 32 provides for the snap-fit of housing 10 in apertures 19. After moving past first outer cylindrical surface 33, second outer cylindrical surface 40 forms the groove 34 to receive the edges of aperture 19, while first opposed surface 37 and second opposed surface 38 can effectively clamp these edges therebetween.

As seen in FIGS. 4–7, second opposed surface 38 terminates outwardly at a third outer cylindrical surface 41. Third outer cylindrical surface 41 spaces second opposed surface 38 from a frustoconical face surface 42. Because second opposed surface 38 has a larger mean diameter than first opposed surface 37, frustoconical face surface 42 has a larger mean diameter than frustoconical surface 32.

Figure 4:
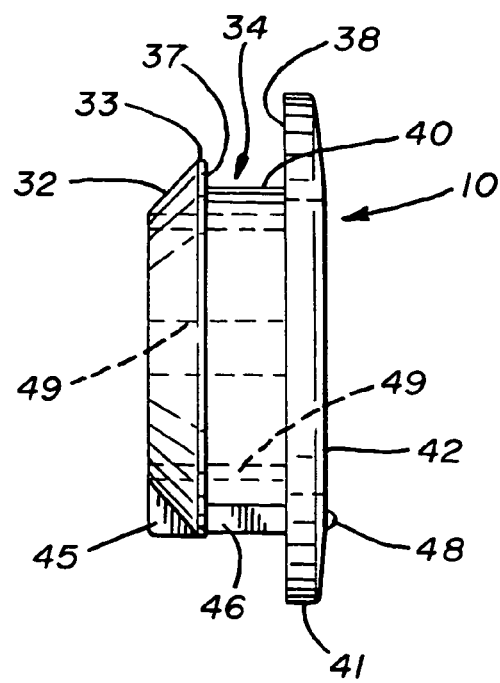
FIG. 4 is an elevational view taken along line 4—4 of FIG. 3.
Figure 5:
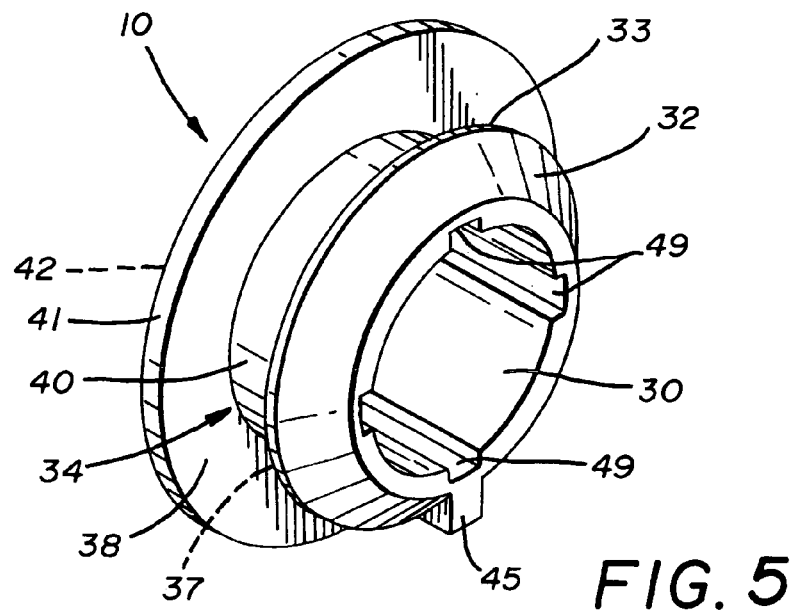
FIG. 5 is a rear perspective view of the proximity sensor housing of the present invention.

To properly function, proximity sensor 12 must be oriented properly with respect to vehicle bumper 14. As such, housing 10 is configured to be properly oriented with respect to vehicle bumper 14, and to receive proximity sensor 12 in the proper orientation. For example, each aperture 19 in bumper face 20 may include a notch (not shown) to facilitate proper orientation of housing 10 with respect to vehicle bumper 14. As seen in FIG. 4, housing 10 includes a first rib 45 and a second rib 46 which cooperate with the above-discussed notch. First rib 45 extends outwardly from frustoconical surface 32, and second rib 46 extends outwardly along second outer cylindrical surface 40. Both first rib 45 and second rib 46 are sized to effectively match the above-described notch, and prevent housing 10 from being inserted into aperture 19 without first lining up first rib 45 and second 46 with the notch. As such, first rib 45 and second rib 46 in conjunction with the notch insure proper orientation of housing 10 with respect to vehicle bumper 14.

Figure 6:
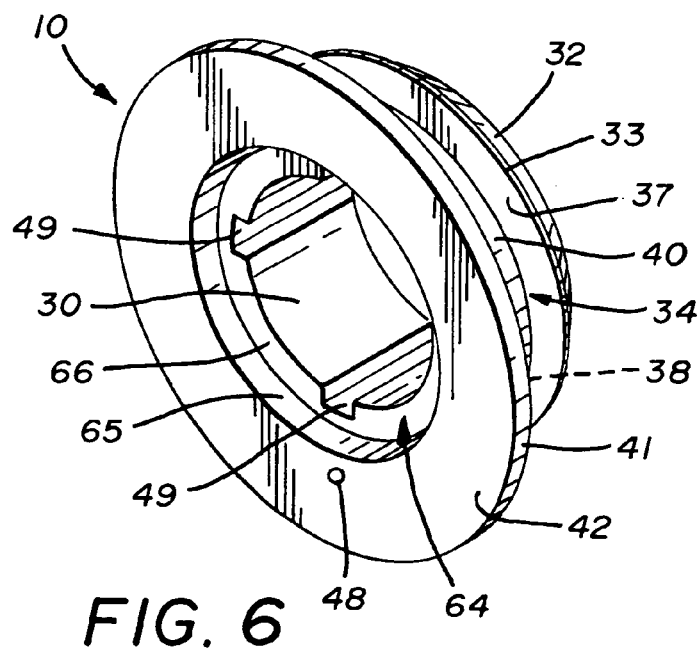
FIG. 6 is a front perspective view of the proximity sensor housing of the present invention.
Figure 7:
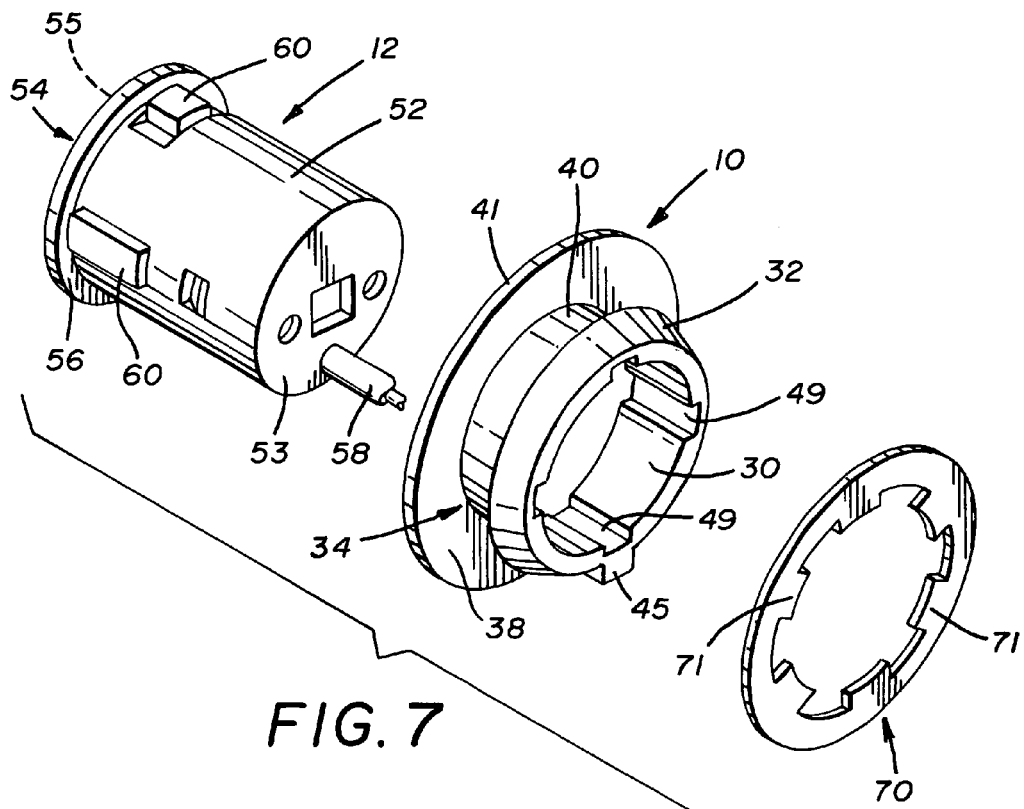
FIG. 7 is an exploded perspective view of an assembly including the proximity sensor housing, a proximity sensor and a retainer ring.

To insure proper orientation of proximity sensor 12 with respect to housing 10, housing 10 (as seen in FIG. 6) is provided with a nub 48 on frustoconical face surface 42, and channels 49 extending along interior surface 30. As seen in FIG. 7, proximity sensor 12 includes a substantially cylindrical surface 52 spacing a back surface 53 from a front plate 54. Front plate 54 includes a first surface 55 and a second surface 56. A wire 58 extends outwardly from back surface 53, wire 58 providing a connection with a vehicle computer (not shown) to facilitate operation of proximity sensor 12.

Figure 8:
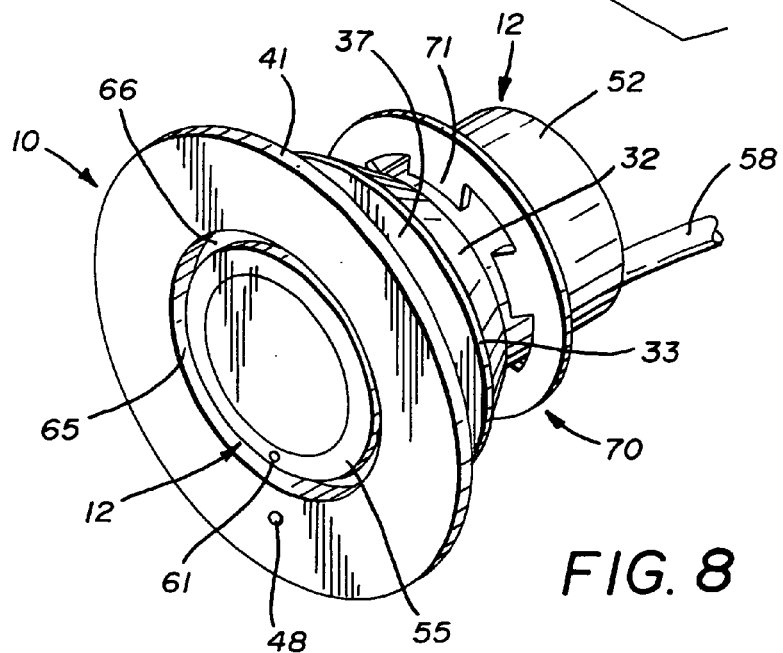
FIG. 8 is an assembled perspective view of the assembly of FIG. 7.

Cylindrical surface 52 of sensor 12 includes four ribs 60 (two shown in FIG. 7) extending partially along its longitudinal length. Ribs 60 are spaced ninety degrees of each other around cylindrical surface 52, and are adapted to fit within channels 49. The insertion of ribs 60 into channels 49 allows proximity sensor 12 to have four orientations with respect to housing 10. However, only one of these orientations is proper. To obtain the proper orientation, a nub 61 is provided on first surface 55 of sensor 12. As seen in FIG. 8, when proximity sensor 12 is inserted in housing 10, and ribs 60 are positioned in channels 49, proximity sensor 12 is properly oriented with respect to housing 10 if nub 48 and nub 61 are aligned.

In addition, as seen in FIG. 6, a depression, generally indicated by the numeral 64, is provided through the middle of frustoconical face surface 42. Depression 64 includes a cylindrical inner surface 65 and a ring-shaped rim surface 66. When proximity sensor 12 is inserted into housing 10, its second surface 56 abuts rim surface 66. Furthermore, the axial length of inner cylindrical surface 65 is effectively deep enough to accommodate the thickness of front plate 54. In fact, inner cylindrical surface 65 can be deep enough to allow proximity sensor 12 to be recessed in depression 64, and resultantly allow frustoconical face surface 42 (as seen in FIG. 8) to protect proximity sensor 12. As such, if vehicle bumper 14 were impacted, then frustoconical face surface 42 would bear the brunt of the impact, and would protect proximity sensor 12 from damage.

To securely retain proximity sensor 12 in housing 10, a retainer ring 70 is provided as seen in FIGS. 7 and 8. Retainer ring 70 slides over cylindrical surface 52, and is positioned adjacent frustoconical surface 32. Retainer ring 70 includes inwardly projecting teeth 71 which engage cylindrical surface 38 to hold proximity sensor 12 in position relative to housing 10. As such, retainer ring 70 secures proximity sensor 12 to housing 10, but thereafter can be removed to allow for separation of housing 10 and proximity sensor 12.

In light of the foregoing, it should thus be evident that a proximity sensor housing constructed as described herein substantially improves the art and otherwise accomplishes the objects of the present invention.

What is claimed is:

1. An energy absorbing bumper comprising an impact face; at least one aperture in said impact face; and a housing in said aperture adapted to receive a proximity sensor; said housing including an interior cylindrical surface, channels extending along said interior cylindrical surface, said interior cylindrical surface and said channels receiving the proximity sensor, a frustoconical surface adapted to slide over the edge of the aperture, and a groove formed by a first opposed surface and a second opposed surface, said first opposed surface and said second opposed surface extending radially outwardly from an exterior cylindrical surface, wherein said edge of said aperture are received therebetween.

2. An energy absorbing bumper according to claim 1, said housing including a face surface, said face surface having a nub, said nub of said face surface adapted to align with a nub provided on the proximity sensor, when the proximity sensor is properly oriented with respect to said housing.

3. An energy absorbing bumper according to claim 2, wherein said channels are adapted to receive ribs provided on the proximity sensor.

4. An energy absorbing bumper according to claim 1, said housing including a face surface, wherein said face surface includes a depression, said depression including a rim surface, the proximity sensor abutting said rim surface when the proximity sensor is received in said interior cylindrical surface and said channels.

5. An energy absorbing bumper according to claim 1, further comprising a retaining ring to secure the proximity sensor in position relative to said housing.

6. An energy absorbing vehicle bumper comprising an impact face; at least one aperture in said impact face; and a housing received in said aperture, said housing having an interior surface adapted to receive a proximity sensor, and a face surface adapted to orient the proximity sensor with respect to said housing, wherein said proximity sensor includes ribs, and said interior surface includes channels, said channels capable of receiving said ribs so that said proximity sensor is oriented in one of four orientations with respect to said housing, said face surface indicating whether said proximity sensor is properly oriented in said one of said four orientations.

7. An energy absorbing vehicle bumper comprising an impact face: at least one aperture in said impact face; and a housing received in said aperture, said housing having an interior surface adapted to receive a proximity sensor in proper alignment with said impact face, and a face surface adapted to orient the proximity sensor with respect to said housing, wherein said housing has a frustoconical surface adapted to slide over the edges of said aperture.

8. An energy absorbing vehicle bumper according to claim 7, wherein said housing has a groove formed by a first opposed surface and a second opposed surface, said edges of said aperture being received in said groove.

9. An energy absorbing vehicle bumper according to claim 8, wherein said first opposed surface and said second opposed surface extend radially outwardly from an exterior cylindrical surface.

10. An energy absorbing vehicle bumper comprising an impact face: at least one aperture in said impact face; and a housing received in said aperture, said housing having an interior surface adapted to receive a proximity sensor in proper alignment with said impact face, and a face surface adapted to orient the proximity sensor with respect to said housing, wherein said face surface has a nub, said nub of said face surface being adapted to align with a nub provided on the proximity sensor, when the proximity sensor is properly oriented with respect to said housing.

11. An energy absorbing vehicle bumper according to claim 10, wherein said aperture is notched, and said housing includes at least one rib sized to match the notch in said aperture, said at least one rib provided to properly orient said housing relative to said impact face.

12. An energy absorbing vehicle bumper according to claim 11, wherein said housing has a frustoconical surface with said at least one rib extending therealong.

13. An energy absorbing vehicle bumper according to claim 6, wherein said face surface includes a depression, the proximity sensor being recessed within said depression when received within said housing.

14. An energy absorbing vehicle bumper according to claim 13, wherein said depression is provided through the middle of said face surface, the proximity sensor abutting a rim surface of said depression.

15. An energy absorbing vehicle bumper adapted to carry at least one proximity sensor comprising an impact face; at least one aperture in said impact face; said housing being received in said aperture and including an interior cylindrical surface and channels extending along said interior cylindrical surface, said interior cylindrical surface and said channels adapted to receive the proximity sensor in proper alignment with said impact face, a face surface having a depression and adapted to orient said proximity sensor with respect to said housing, the proximity sensor being recessed within said depression when positioned in said housing, a frustoconical surface adapted to slide over the edges of said aperture, and a groove formed by a first opposed surface and a second opposed surface, said first opposed surface and said second opposed surface extending radially outwardly from an exterior cylindrical surface, wherein said edges of said aperture are received between said first and second opposed surfaces.

16. An energy absorbing vehicle bumper according to claim 6, wherein said face surface includes a nub, said nub of said face surface adapted to align with a nub provided on said proximity sensor, when said proximity sensor is properly oriented with respect to said housing.

* * * * *